United States Patent Office 3,537,685
Patented Nov. 3, 1970

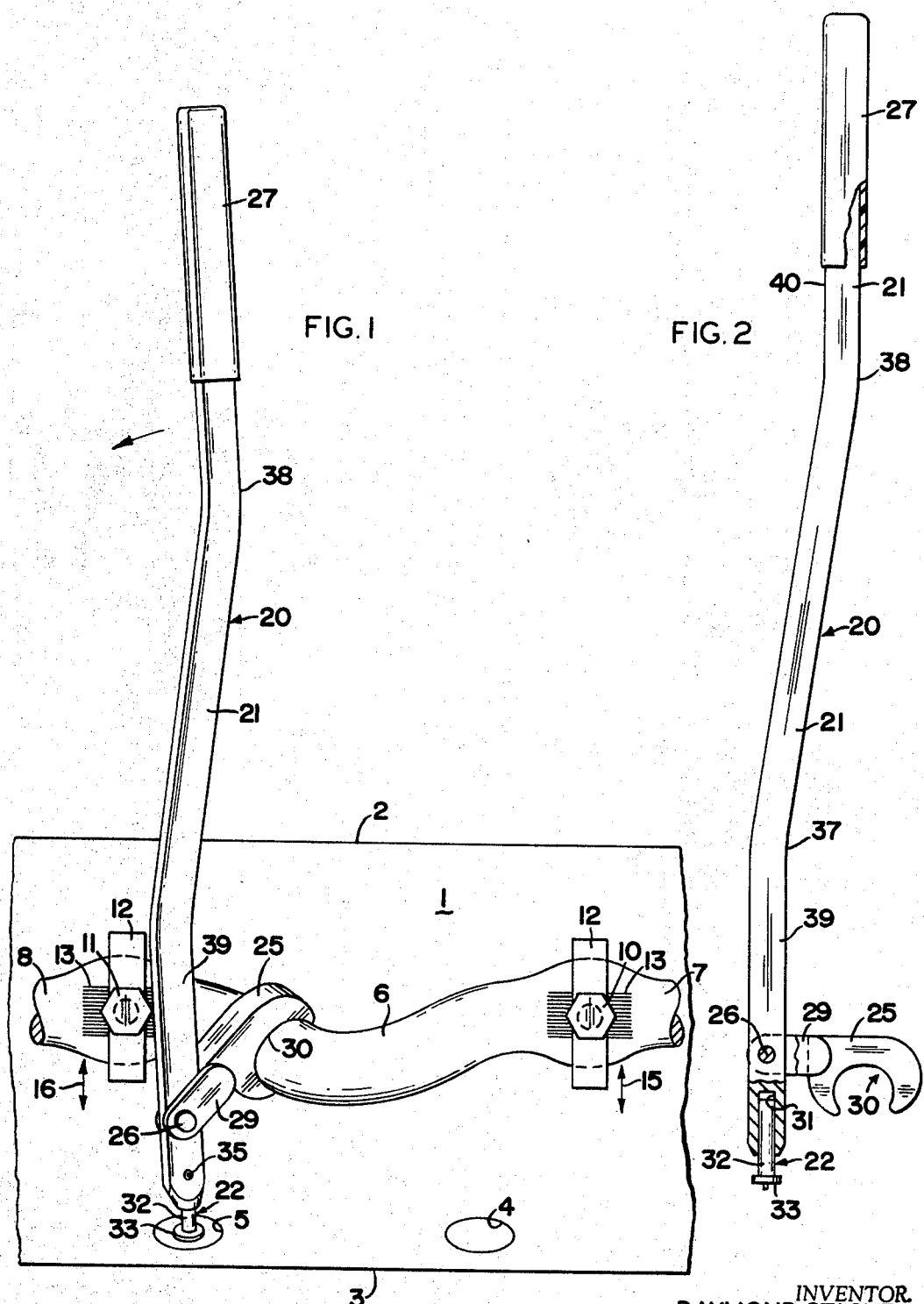

3,537,685
TOOL FOR ADJUSTING CAMBER AND CASTOR OF VEHICLES
Rafael A. Gregory, deceased, late of Cleveland, Ohio, by Raymond A. Stachewicz, administrator, Garfield Heights, Ohio, assignor to Robert A. Schurr, Solon, Ohio
Filed Apr. 16, 1968, Ser. No. 722,818
Int. Cl. B66f 3/00
U.S. Cl. 254—131                                                    4 Claims

ABSTRACT OF THE DISCLOSURE

A tool for adjusting camber and castor of motor vehicles is provided with a rodlike body which is slightly S-shaped to increase the range of permissible adjustments and a force-limiting replaceable tip which is adjustable as to length is mounted in a cavity at the lower end of the body to protect the tool against irreparable damage. An arm having at its free end an enlarged portion with a transverse, generally inverted U-shaped opening therein for receiving the cross-member of an A-frame that carries the wheel suspension is pivotally mounted on the lower portion of the body.

---

This invention relates to a tool for adjusting the camber and castor of motor vehicles and particularly those manufactured by the Ford Motor Company since 1965. In the motor vehicles of the above type, the independent front wheel suspension assembly comprising the ball joints and the like is carried by A-shaped frames, the upper one of which is adjustably mounted on a front portion of the frame of the car. The camber and castor of the front wheels are adjusted by moving the upper A-frame with respect to the frame of the motor vehicle.

The present invention is directed toward a tool which is uniquely adapted to make the camber and castor adjustments. Frequently in making the adjustments by tools heretofore provided, when the A-frame member was, because of rust or lack of care, not sufficiently loosened from the vehicle frame, the operator applied too much pressure and broke the expensive tool so that it had to be discarded. Furthermore, such tools as were previously proposed have not been of the proper shape to permit control in the range of movement frequently required.

It is an object of the present invention to provide a tool for adjusting the castor and camber of motor vehicles manufactured by the Ford Motor Company, which tool has a built-in replaceable stress-limiting device which prevents damage to the tool as a whole.

It is another object of the present invention to provide a tool for making said adjustment having a shape that permits wide movement of the cross-member of the A-frame with respect to the vehicle frame so as to make large adjustments in castor and camber.

Other objects will be apparent from the following description of the invention as illustrated by the accompanying drawing, in which:

FIG. 1 is a plan view of a portion of the upper frame rail of a motor vehicle showing portions of the cross-member of the A-frame attached thereto and showing the adjusting tool of the present invention in position; and FIG. 2 is a side elevational view, partly in section, of the camber and castor adjusting tool of the present invention.

Referring more particularly to the drawing wherein like parts are designated by like numerals of reference throughout the several views, the frame of the car has an upper frame rail 1 disposed on one side of the car between engine and fender portions. The rail 1 has an engine side (or side adjacent the engine) 2 and a fender side (or side adjacent the fender) 3. The rail 1 is provided with holes 4 and 5, respectively, drilled therethrough for use with the tool of the present invention.

The cross-member 6 of the upper A-frame carries the wheel suspension (not shown) attached at or near end portions 7 and 8 thereof. The upper A-frame cross-member 6 is attached to the frame by means of bolts 10 and 11. The adjusting hole 4 is disposed toward the fender side 3 near the bolt 10 and the adjusting hole 5 is similarly disposed near the bolt 11. The locking members 12 are carried by the bolts 10 and 11, respectively, and the cross-member of the A-frame is provided with grooved surface portions 13 to interfit with suitable protrusions on the underside of the locking members 12, so that when the bolt 10 is loosened and the locking member 12 is sufficiently raised from the cross-member 6, the end portion 7 of the cross-member 6 can be moved in the direction of the arrows 15. When the bolt 11 is loosened and the locking member 12 carried thereby is permitted to raise from the groove surface 13 of the end portion 8 may be moved in the direction of the arrows 16.

The tool 20 of the present invention is a leverlike instrument having a rodlike body portion 21 with an upper handle portion 27 and a lower portion 39. The axis of the upper portion is preferably substantially parallel to but laterally displaced from the longitudinal axis of the lower portion to provide a generally S-shaped configuration to the body portion 21. The lower end of the lower portion 39 is drilled to provide a cavity 31 with cylindrical walls which are relatively thick and at least one-third the diameter of the cavity. A lower replaceable and adjustable rod-shaped end member 22, which is adapted to be inserted into the holes 4 and 5 of the frame 1 of the vehicle and serve as the fulcrum of the tool, is slidably carried in the cavity 31. An arm 25 has at one end thereof a bifurcated portion 29 and is connected to the lower portion 39 by the pivot pin 26. The pivot point 26 of the arm 25 is disposed near but spaced from the end portion 22 or the protruding portion thereof so that the lever arm or distance from the pivot point 26 of the lever to the point 26, where the arm 25 is connected to the portion 39, is but a small fraction of the distance between the protruding portion of the end member 22 and the handle portion 27. The free end of the arm 25 has an enlarged portion with an inverted U-shaped or C-shaped opening 30 therein.

The U-shaped opening 30 has end portions closer together than the base thereof and is adapted to fit snugly around the cross-member 6 of the A-frame of the vehicle, as shown in FIG. 1.

The end member 22 has a rod or cylindrical portion 32 preferably with cylindrical walls, and preferably an enlarged head portion 33. Means such as a suitable set-screw 35 is provided to clamp the member 22 in the desired position so that the head 33 is conveniently located with respect to the pivot point 26 where the arm 25 is connected to the body of the tool. The distance between the pivot 26 and the fulcrum or protruding portion of the end member 22 is but a small portion, preferably ⅛ to ½₀ of the length of the body portion 21 of the tool 20.

The axis of the upper handle portion 27 is offset toward the arm 25 from the axis of the lower portion 39.

The diameter of the rodlike portion 32 of the replaceable and adjustable end member 22 and of the cavity 31 is preferably not appreciably more than ½ the thickness or diameter of the lower portion 37 of the body 21 of the tool 20 so that it will fracture or bend if too much stress is applied at the handle 27 when the end portion is in the opening 4 or 5.

In the operation of the device of this invention, the protruding end, including the head 33, of the end member 22 is placed in one of the holes 4 or 5. The walls of the opening 30 in the arm 25 is disposed over the cross-member 6, as shown, the bolts 10 and/or 11 are loosened and the cross-member moved as desired in the direction of the arrows 15 and 16. The offset in the body permits much greater adjustment than is possible when the body portion is straight.

It is to be understood that in accordance with the provisions of the patent statutes, variations and modifications of the specific device herein shown and described may be made without departing from the spirit of the invention.

What is claimed is:

1. A tool suitable for adjusting camber and castor of certain motor vehicles having independent front wheel suspensions carried by an A-shaped frame which has a cross-member adjustably carried by the vehicle frame, said tool having a rodlike body having an upper handle portion and a lower portion, the longitudinal axis of the upper portion being laterally displaced from the longitudinal axis of the lower portion to provide a slightly S-shaped configuration, the end of said lower portion having a generally cylindrical cavity therein, the axis of which coincides substantially with the axis of said lower portion, said cavity having relatively thick walls, the thickness of which is at least ⅓ the diameter of said cavity, an end member having a rod-shaped cylindrical portion of a diameter to fit slidably but snuggly in said cavity and of sufficient length to protrude from said lower portion of said body, means for adjustably controlling and locking the length of the protrusion of said end member, an arm member having at the one end a bifurcated portion which is pivotally connected to said body at said lower portion thereof and at the free end an enlarged portion with an inverted generally U-shaped opening therein, the axis of said U-shaped opening being transverse to the axis of said lower body portion of said tool and being of a size to fit over said cross-member of said A-frame, the point of attachment of said arm being spaced from said rod-shaped member by a small fraction of the length of said body portion, whereby when said protruding portion of said end member is used as a fulcrum the force exerted through said arm will be many times the force applied to said handle portion and whereby when said force becomes too great fracture of said protruding portion of said rodlike member occurs, protecting said tool.

2. The tool of claim 1 wherein the sidewalls of said inverted U-shaped opening are closed together at the opening of said "U" than at the base thereof.

3. The tool of claim 2 wherein the distance from the point of pivotal attachment of said arm to the protruding end of said rod member is ⅛ to 1/20 the length of said body portion.

4. The tool of claim 3 wherein said end member has an enlarged head portion at the free end thereof.

References Cited

UNITED STATES PATENTS 3,286,988   10/1966   Du Faur _____ 254—131

OTHELL M. SIMPSON, Primary Examiner

D. R. MELTON, Assistant Examiner